(12) United States Patent
Himmelsbach et al.

(10) Patent No.: US 6,630,227 B1
(45) Date of Patent: Oct. 7, 2003

(54) SELF-ADHESIVE SHAPED ARTICLE

(75) Inventors: Peter Himmelsbach, Buxtehude (DE); Dorothee Drewes, Hamburg (DE); Klaus Külper, Pinnenburg (DE); Joachim Nick, Tornesch (DE); Oliver Nickel, Hamburg (DE); Stefanie Walter, Berlin (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/705,551

(22) Filed: Nov. 3, 2000

(30) Foreign Application Priority Data

Nov. 4, 1999 (DE) .......................... 199 53 097

(51) Int. Cl.$^7$ ................................. B32B 3/00
(52) U.S. Cl. ............... 428/156; 428/40.1; 428/41.7; 428/41.8; 428/42.2; 428/42.3; 428/74; 428/906; 428/608; 428/101; 428/220; 156/94; 156/246; 156/247; 156/280; 156/306.3
(58) Field of Search ................ 428/157, 156, 428/159, 160, 317.3, 317.1, 319.3, 906, 74, 40.1, 41.7, 41.8, 42.2, 42.3, 608, 101, 220; 156/94, 306.3, 247, 246, 280

(56) References Cited

U.S. PATENT DOCUMENTS

| | | | | |
|---|---|---|---|---|
| 4,996,092 A | * | 2/1991 | Francis et al. | 428/157 |
| 5,260,097 A | * | 11/1993 | Silvestre | 427/282 |
| 5,885,395 A | * | 3/1999 | Western | 156/247 |

FOREIGN PATENT DOCUMENTS

| | | | |
|---|---|---|---|
| EP | 0 365 510 A1 | | 4/1990 |
| EP | 0365510 | * | 4/1990 |
| EP | 0 623 688 A1 | | 9/1994 |
| EP | 0623688 | * | 9/1994 |
| WO | WO 99/52646 | | 10/1999 |
| WO | 9952646 | * | 10/1999 |

\* cited by examiner

Primary Examiner—Merrick Dixon
(74) Attorney, Agent, or Firm—Norris McLaughlin & Marcus

(57) ABSTRACT

An unfoamed, flexible, elongate shaped article having at least partially fibrous structure, intended for masking a substrate and having a thickness of more than 3 mm, which article under a load of 5 N/cm has an elongation of at least 10%; is at least partially self-adhesive; is compressible by at least 10% in thickness; and has a flexural stiffness in the longitudinal direction of less than 200 N×cm$^2$.

38 Claims, 2 Drawing Sheets

1

SELF-ADHESIVE SHAPED ARTICLE

FIELD OF THE INVENTION

Figure 1:
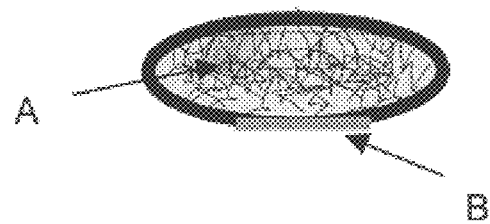

The invention describes an unfoamed self-adhesive product with a fibrous structure for masking. Preference is given to applications for masking surfaces which are to be treated, furnished, upgraded or coated.

BACKGROUND OF THE INVENTION

In the treatment, furnishing, upgrading and coating of surfaces it is common to use self-adhesive masking tapes in order to protect areas which are not to be treated, furnished, upgraded or coated. Following the treatment, furnishing, upgrading and/or coating, these tapes may be removed. Especially when coating with a coating material, this tape may be removed before or after physical or chemical curing. Advantageous materials exhibit a certain level of resistance to the product against which protection is intended. Moreover, they are inert toward the substrate. In addition, there are products for masking over a long period of time.

Especially in the case of masking tapes for decorating and painting work, preference is given to self-adhesive products which can be detached without residue. Absorption, or at least good adhesion, of the coating products on the masking tape is necessary. In general, these products comprise thin papers, foils or films which are adapted to the requirements by means of appropriate treatment steps. In general, these products are available in various configurations, and commercially. A disadvantage of these products in some applications is their low thickness. In the case of spray painting in the automotive refinish sector, in particular, beads and gaps can be sealed off with respect to the spray mist only by means of complicated multiple masking with a thin product. Moreover, products designed in this way possess little compressibility. Another possibility is to insert a foam into the area. However, this does not make it possible to achieve sharp edges. A further disadvantage is that foams always have a cellular structure. Foams of high strength are, accordingly, not very open and are therefore able to absorb a fairly small amount of coating material. Very open foams provide good coating material absorption but exhibit poor strength. Therefore, open foams are unsuitable for strongly adhering application.

EP 0 365 510 discloses an elongate, compressible and flexible foam cushion which withstands surface treatment and is intended for the masking of surfaces that are to be treated.

EP 0 384 624 likewise discloses a foam which has not been cold-welded but which may have been treated with an adhesive.

It was an object of the invention to develop a product which does not have the aforementioned disadvantages.

This object has been achieved by means of a shaped article as claimed in claim 1, in particular by means of an unfoamed, flexible, elongate shaped article for masking a substrate and having a thickness of more than 3 mm, wherein the shaped article under a load of 5 N/cm (width) has an elongation of at least 10%, is at least partially self-adhesive, is compressible in thickness (or height or Z-direction) by at least 10%, and has a flexural stiffness in the longitudinal direction of less than 200 N×cm².

Simple masking of gaps in substrates is possible specifically through the bulky, flexible nature of the shaped article. In a further embodiment, the shaped article has a thickness of from 4 to 200 mm, preferably from 5 to 120, and with particular preference from 6 to 30 mm. An important factor is that a deformation in the gap is compensated by effective elastic resilience. Depending on the application, the shaped article is compressible in its height (or thickness, Z-orientation) by from 20 to 95% and so covers a wide spectrum of fields of use. In order to ensure effective coverage of curves, without creases, extensibility in the longitudinal direction of at least 10% is required. Preference is given to shaped articles having an extensibility of from 20 to 2000%, with particular preference from 25 to 1000%, with very particular preference from 30 to 500%. An important feature for effective conformation is an appropriate flexural stiffness. For application as a masking material, flexural stiffnesses of less than 200 N×cm² have proven advantageous. Preference is given to flexural stiffnesses of between 0.1 and 30 N×cm², with particular preference between 0.5 and 20 N×cm². A significantly safe application was achieved with moldings having a width of at least 4 mm. Preference is given to shaped articles having a width of from 6 to 200 mm, with particular preference from 8 to 30 mm.

Soft coating-material edges are achieved by using, in particular, circular or oval cross sections or edges having circular radii. A height/width ratio of less than one, preferably from 0.1 to 0.95, with particular preference from 0.2 to 0.95, has proven advantageous for the application. Sharp edges may be achieved by means of flat profiles. Furthermore, the shaped article may also be asymmetric in structure, so that only one edge is rounded.

To absorb the coating materials, a sufficiently high degree of wetability is advantageous. Shaped articles comprising substances having a fibrous structure are favorable. However, substances with a large surface area also find application. This is likewise important for effective adhesion of coating material to the shaped article. The addition of auxiliaries may assist.

Furthermore, the shaped article may also have been pretreated. In particular, irradiation, or discharge (e.g., corona) or flame treatment may be used in relation to the application.

In general, the subject matter of the invention comprises oriented or unoriented individual fibers or filaments, the fibers possessing good adhesion with respect to one another.

Spun fiber webs or filament webs have shown themselves to be advantageous. In one preferred embodiment of the subject matter of the invention, the subject matter is obtained by mechanical or aerodynamic, hydrodynamic or thermodynamic processes or a combination thereof. Preference is given to dry-laid, wet-laid or spunbonded webs or laminates formed by combining said types of web. Bulky webs made from spun polymer fibers are particularly preferred as the core. Such webs are produced by entangling the polymeric melt in the face of a stream of air and/or by permanent swivel movements of the spinning manifolds, and is sufficiently well known from the prior art.

When laminated structures are used, wet- or dry-laid webs are also favorable, at least in part, for specific applications.

In an alternative application, the fibers are also processed as threads or multistrand yarns and in wovens or knits. Spacer knits or spacer wovens are advantageous, being connected by more or less rigid spacer threads and so having a sufficiently high long-term resilience.

In one specific embodiment, a web overstitched by means of yarns is used as a three-dimensional shaped structure for masking surfaces, the number of stitches on the web being advantageously at least 3/cm, preferably from 5/cm to 50/cm. The ultimate tensile stress strength of the subject matter of the invention is at least 10 N/cm, preferably from 20 to 450 N/cm, with particular preference from 30 to 250 N/cm, the force being based on the width of the subject matter of the invention.

Accordingly, materials which can be used for the yarns are, advantageously, polymeric fibers of polypropylene, polyester, polyamide, aramid or polyethylene, and also mineral fibers such as glass fibers or carbon fibers. In addition, it is also possible to use multistrand yarns or mixed multistrands, especially Sirospun yarns. For specific applications, single- or multistrand fiber blend yarns may also be used. Furthermore, the yarns may have been at least partly colored in order to make the backing material more visually appealing. In alternative embodiments, fibers of natural origin such as cotton, silk, flax or staple viscose rayon were used.

For specific applications, the yarn may also be elastic, From this there is then regenerated an elastic base support having an elongation of up to 250% under a load of 10 N/cm. Mention may be made here, for example, or a polyamide yarn. A structure of this kind generates a compression force of from 0.2 N/cm to 10 N/cm at an elongation of from 20% to 70%.

In the case of the alternative embodiment of the subject matter of the invention, a nonwoven web is used as backing material for masking surfaces. The web is reinforced by the formation of stitches formed by loops from the fibers of the web, the number of stitches on the web being advantageously at least 3/cm, preferably from 5/cm to 50/cm. The ultimate tensile stress strength of the subject matter of the invention is at least 10 N/cm, preferably from 20 to 450 N/cm, with particular preference from 50 to 250 N/cm, the force relating to the width of the subject matter of the invention.

In a further embodiment, two plies of nonwoven are consolidated by means of at least one yarn. An advantageous feature here, owing to the flexural stiffness and particular elastic resilience of the yarn, is the three-dimensional character of the embodiment.

The subject matter of the invention is based on known webs which are mechanically consolidated either by overstitching with separate yarns or by looping. In the first case, the resulting structures are the web-yarn stitchbonds. For their production, a fiber web is taken, which can, for example, be in cross-plating configuration and is overstitched with separate yarns in pillarstitch formation or tricot formation.

These webs are known by the name "Maliwatt" (from the company Malimo) or Arachne.

With the second type of consolidation, again, preferably a cross-plated web is taken. In the course of the consolidation operation, needles draw out fibers from the web itself and form them into loops, with stitches being formed in pillarstitch formation. This web stitchbond is in circulation under the name "Malivlies" [Malifleece], again from the company Malimo.

An overview of the various kinds of mechanically consolidated fiber nonwovens can be found in the article "Kaschierung von Autopolsterstoffen mit Faservliesen" [Laminating car upholstery materials with fiber webs] by G. Schmidt, Melliand Textilberichte 6/1992, pages 479 to 486.

Advantageously, the webs have longitudinal stitches, in which case the orientation of the yarns ought to be aligned in accordance with the stresses on the backing material in use.

Starting materials which may be used for the nonwoven are, generally, all organic and inorganic, natural- and synthetic-based fiber materials. Examples that may be mentioned include viscose, cotton, silk, polypropylene, polyester, polyurethane, polyamide, aramid or polyethylene and also mineral fibers such as glass fibers or carbon fibers. The present invention, however, is not restricted to said materials; rather, it is possible to use a large number of other fibers for web forming.

The fibers used to form the web preferably have a water retention capacity of more than 0.5%, preferably between 2 and 70%, with particular preference between 3 and 50%.

For a web overstitched with yarns, this is achieved firstly by the use of a yarn material having a high modulus of elasticity and secondly by the use of stitching which ensures a yarn position which is stretched as much as possible.

Advantageous combinations of materials are, for example, yarns of high-strength polymer fibers such as polyamide, polyester, highly stretched polyethylene, or mineral fibers such as glass, and initial web materials such as cotton or staple viscose rayon.

For a web in which the formation of stitches takes place by the loops being formed from the fibers of the web, the material of the initial web should be selected accordingly; corresponding comments apply to the stitching.

It has also been found advantageous for the subject matter of the invention to have a basis weight of less than 12,000 g/m$^2$, preferably from 50 to 10,000 g/m$^2$, with particular preference from 150 to 3000 g/m$^2$.

In a further advantageous embodiment, the subject matter of the invention is tearable by hand perpendicular to the orientation of the stitches and/or in the direction of the stitches. This finds its application when the structure of the invention is wound up on itself to form a roll.

In another embodiment, this tearability is unnecessary. In this case, the materials involved may be prepunched structures for the masking of surfaces.

Furthermore, the subject matter of the invention may have been reinforced with one or more monofil, multifil, staple fiber of spun fiber yarns and/or with oriented high-strength fibers, the yarns and/or fibers having in particular a tenacity of at least 20 cN/tex.

In addition, it is also possible to employ multistrand yarns or mixed multistrands, especially Sirospun yarns. For specific applications, single- or multi-strand fiber blend yarns may also be employed. These may comprise, for example, core-spun yarns or special staple fiber core-spun yarns.

An advantage here is that by combining different fiber types it is possible to achieve particular properties or specific properties in the reinforcement thread. Examples of this are the combination of polyester or polyamide with cotton or staple viscose rayon.

The reinforcement fibers or filaments here may comprise organic or inorganic materials: for example, and preferably, glass, carbon, polyester or specific polyamides, and the reinforcement fibers may also have been at least partly colored in order to make the subject matter of the invention more visually appealing. In this way it is readily possible to differentiate, visually, the reinforced backings. Colored glass filaments or polymer filaments are particularly suitable for this purpose.

In one advantageous embodiment, through the addition of high-strength fibers or filaments having an ultimate tensile stress strength or more than 40 cN/tex, the backing material exhibits an ultimate tensile stress strength or more than 50

N/cm and an ultimate tensile stress elongation of less than 25% for a basis weight of less 840 g/m².

The number of attached or introduced filaments or high-strength fibers depends primarily on the particular intended use and on the desired ultimate tensile stress strength and ultimate tensile stress elongation of the subject matter of the invention, on is inherent nature and on the respective strength of the fibers and filaments themselves, and may therefore vary within relatively wide limits.

Advantageous combinations of material are, for example, reinforcement filaments or fibers of high-strength polymer fibers such as polyamide, polyester, highly stretched polyethylene, or mineral fibers such as glass, and initial web materials such as cotton or staple viscose rayon.

In addition, the reinforcements are preferably inserted specifically in accordance with the direction of stress of the subject matter of the invention, i.e., in the longitudinal direction. If more appropriate, however, they may also extend only or additionally in the transverse or oblique direction, or, for example in curved, spiral or zigzag formation, or randomly.

In one further advantageous embodiment, the backing material may be torn by hand perpendicularly to the orientation of the reinforcement and/or in the direction of the reinforcement.

With greater strength of the web material and an increasing proportion of reinforcement fibers, the backing withstands greater stress and loading. Even very highly reinforced subject matter of the invention is able to absorb or allow the passage of large amounts of moisture, and thus provides a pleasant sensation for the user, with the reinforcements absorbing little or no moisture and so undergoing no change in their properties.

As materials for shaped articles it is possible, accordingly, to use polymeric fibers of polypropylene, polyester, polyamide, aramid or polyethylene and also fibers of natural origin such as cotton or staple viscose rayon, or combinations thereof. Further processing such as cladding, laminating, spinning, twisting, interstitching, interlooping, weaving or knitting may exhibit advantages for specific application. The use of spacers is likewise advantageous.

The shaped article is preferably cuttable and/or tearable transversely by hand. In some cases, a prefabricated perforation may be advantageous.

The self-adhesive coating may be applied either by direct coating or by transfer coating. In the case of transfer coating, an auxiliary support, such as release paper, release film, roller or belt is coated first and the actual shaped article is then supplied. A further possibility is to apply the adhesive composition partially to the shaped support, by means, for example, of halftone printing, screen printing, thermal flexographic printing or gravure printing. Full-area coating, however, is likewise possible. Spinning or spraying may give the product particular properties. For one particular embodiment, the self-adhesive area is situated within the projection area in plan view.

For coating, preference is given to a self-adhesive composition which has a high bond strength. As the adhesive compositions, it is possible with advantage to use self-adhesive compositions based on natural and synthetic rubbers and on other synthetic polymers such as acrylates, methacrylates, polyurethanes, polyolefins, polyvinyl derivatives, polyesters or silicones with corresponding additives such as tackifier resins, plasticizers, stabilizers and other auxiliaries, such as fillers where necessary.

Thermoplastic hot-melt adhesive compositions, in particular, have advantageous properties and are favored for reasons concerned with the production process.

Preferred hot-melt adhesive compositions based on block copolymers are notable for their diverse possibilities for variation, since the controlled reduction in the glass transition temperature of the self-adhesive composition as a consequence of the selection of the tackifiers, plasticizers, polymer molecule size and molecular distribution of the starting components ensures the required bonding to the substrate in a manner appropriate to their function, even at critical points of the human locomotor system.

The high shear strength of the hot-melt adhesive composition is achieved through the high cohesiveness of the polymer. The good tack results from the range of tackifiers and plasticizers employed.

For especially strongly adhering systems, the hot-melt adhesive composition is based preferably on block copolymers, especially A-B, A-B-A block copolymers or blends thereof. The hard phase A is principally polystyrene or its derivatives and the soft phase B comprises ethylene, propylene, butylene, butadiene, isoprene or mixtures thereof, particular preference being given here to ethylene and butylene or their mixtures.

In one advantageous embodiment, the hot-melt adhesive composition has the composition stated below:

from 10% by weight to 90% by weight of block copolymers, from 5% by weight to 80% by weight of tackifiers such as oils, waxes, resins and/or mixtures thereof, preferably mixtures of resins and oils, less than 60% by weight of plasticizers, less than 15% by weight of additives, less than 5% by weight of stabilizers.

The aliphatic or aromatic oils, waxes and resins used as tackifiers are preferably hydrocarbon oils, waxes and resins, the consistency of the oils, such as paraffinic hydrocarbon oils, or of the waxes, such as paraffinic hydrocarbon waxes, accounting for their favorable effect on bonding to the skin. Plasticizers used are medium-chain or long-chain fatty acids and/or their esters. These additions serve to adjust the adhesion properties and the stability. If desired, further stabilizers and other auxiliaries are employed.

The shaped article of the invention has a bond strength to steel of at least 0.5 N/cm (coating width), in particular a bond strength of between 1.0 N/cm and 25 N/cm, with particular preference from 1.5 to 22 N/cm. Different bond strengths may be achieved on other substrates.

Following application, the shaped article is detachable without residue, even when there has been a thermal load of more than 60° C. Special embodiments permit a thermal load of from 65° C. to 220° C., with particular preference from 68° C. to 150° C., with very particular preference from 70° C. to 120° C.

In an alternative utility, the shaped article is prepared by calendering, welding, thermal embossing, thermoforming, hydrophobicizing, priming, impregnating, and/or coating.

In one advantageous embodiment the shaped article is disbondable by stretching.

FIG. 1 describes the forming of a shaped article from a bulky web (A) and a self-adhesive composition (B).

Figure 2:
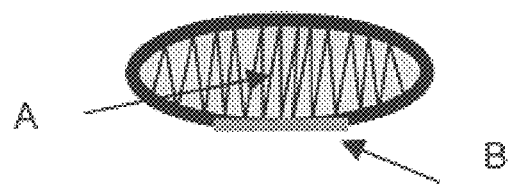

FIG. 2 describes the forming of a shaped article from a spacer knit (A) and a self-adhesive composition (B).

Figure 3:
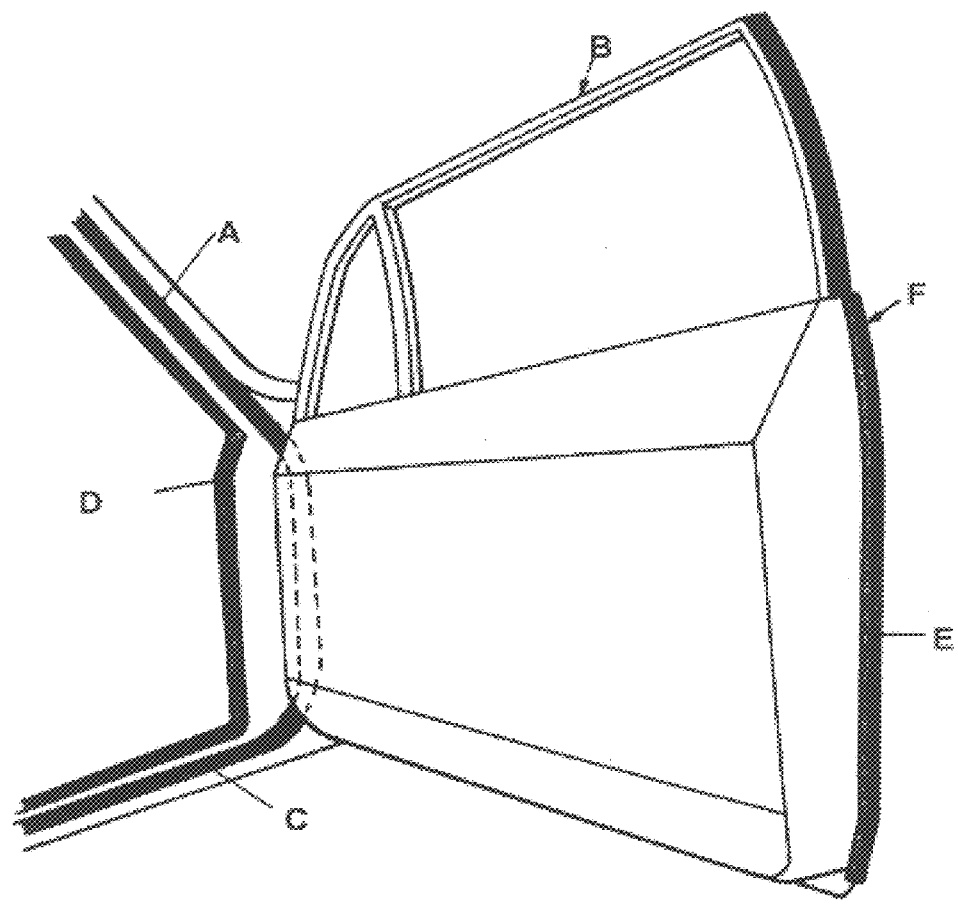

FIG. 3 describes the application of the shaped article of the invention, based on the example of an automobile door. And A to F represent different possibilities.

Figure 4:
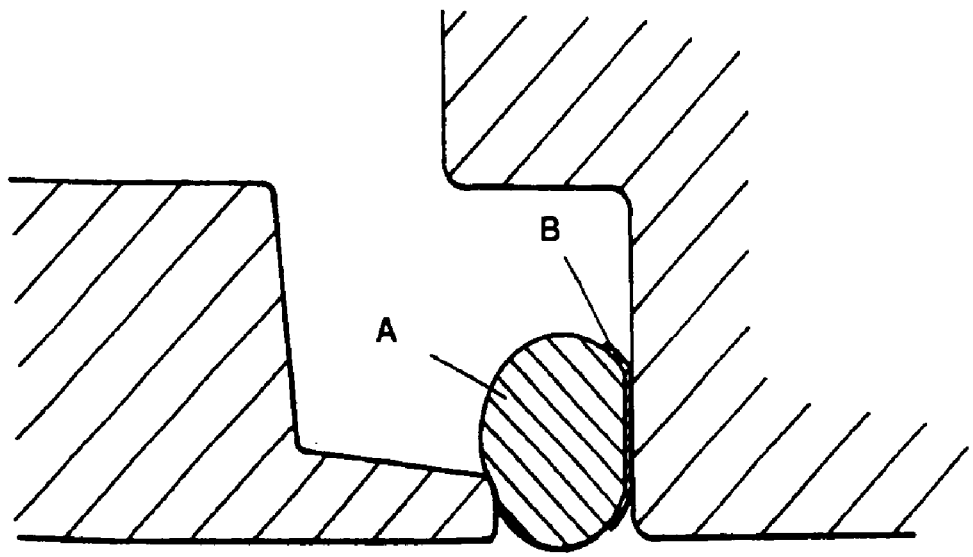

FIG. 4 depicts the compression of the shaped article of the invention in the application. A describes the bulky layer and B the self-adhesive layer of the structure.

In the text below, a preferred shaped article is described by way of example, without wishing thereby to restrict the invention unnecessarily.

EXAMPLE 1

The shaped article comprises two outer unfoamed layers of nonwoven which with the aid of a spacer filament acquire a spatial alignment of 6 mm. The nonwoven webs have been overstitched with a polyester yarn of sufficiently high flexural stiffness, the stitch count being 22/cm of structure width. The water absorption of the polyester yarn was 0.3%. Following overstitching, the nonwovens were placed against one another and joined by means of mechanical and thermal forming. The cross section of the shaped structure is approximately oval, the width being 29 mm and the height 11 mm. Excess joining seam was removed. Subsequently, the shaped structure was impregnated and provided on one side with a self-adhesive composition. The adhesive composition used was a solvent-based natural rubber adhesive composition. The composition comprises 45% natural rubber, 40% hydrocarbon resin (tradename: Hercures 5742), 14% inorganic filler based on zinc oxide, and 1% aging inhibitor. These substances are brought into solution in accordance with the methods customary in the rubber industry. The solvent used is special boiling-point spirit 60/95, the solids content is 37%. The composition is applied by knife-coating in a layer thickness such that after the spirit has dried off a mass application of 40 g/m² remains. The elongation of the shaped structure under 5 N/cm load is approximately 120%. The height is compressible by 50%. The flexural stiffness in the longitudinal direction is 20 N×cm².

EXAMPLE 2

The shaped article comprises a laminate comprising three layers: an upper layer of viscose nonwoven having a thickness of 150 μm, a middle layer based on a polyester nonwoven and a bottom layer comprising a viscose nonwoven having a thickness of 150 μm. The middle layer has a thickness of 11 mm, which is compressible to 3 mm. The width of the shaped article is 13 mm. The cross section of the shaped article is oval. The top and bottom layers had been bonded to the middle layer with overlap. This was done using a spray adhesive. The elongation of the shaped article was 45%. It exhibited a flexural stiffness of 18 N×cm². The bottom layer was given a self-adhesive treatment using a hot-melt self-adhesive composition. The shaped article was transfer-coated with adhesive compositions.

The hot-melt pressure-sensitive adhesive composition is made up as follows:
  a A-B/A-B-A block copolymer comprising hard and soft segments. Preferably, A is a polymer block based principally on styrene and B is a polymer block based on ethylene and butylene (Kraton G). The ratio of the A-B-A type to the A-B is 7:3. The proportion of the adhesive composition is 64%
  a paraffinic hydrocarbon (32%)
  hydrocarbon resins (3.5%). (Super Resin HC 140)
  an aging inhibitor (<0.5) (Irganox 1076)

The components used were homogenized in a thermal mixer at 175° C. The softening point of this adhesive composition is approximately 95° C. (DIN 52011) and it has a viscosity of 2400 mPas at 150° C. (DIN 53018, Brookfield DV II, sp. 21)

Transfer coating was carried out at 50 m/min and a temperature of 120° C. The backing material was coated with 47 g/m².

What is claimed is:

1. A unfoamed, flexible, elongate shaped article having an at least partially fibrous structure, intended for masking a substrate and having a thickness of more than 3 mm, which article:
   a) has an elongation of at least 10%,
   b) is at least partially self-adhesive,
   c) is compressible by at least 10% in thickness or height or in a Z-direction, and
   d) has a flexural stiffness in a longitudinal direction of less than 200 N×cm².

2. The shaped article as claimed in claim 1, whose thickness is from 4 to 200 mm.

3. The shaped article as claimed in claim 1, whose elongation under a load of 5 N/cm is from 20% to 2000%.

4. The shaped article as claimed in claim 1, which has elastic resilience.

5. The shaped article as claimed in claim 1, which is compressible by from 20 to 95% in thickness or height or in a Z-direction.

6. The shaped article as claimed in claim 1, whose flexural stiffness is between 0.1 and 30 N×cm³.

7. The shaped article as claimed in claim 1, which has a width of at least 4 mm.

8. The shaped article as claimed in claim 1, which has a circular or oval cross section.

9. The shaped article as claimed in claim 1, whose height/width ratio is not more than 1.

10. The shaped article as claimed in claim 1, which exhibits coating material adhesion.

11. The shaped article as claimed in claim 1, which exhibits coating material absorption.

12. The shaped article as claimed in claim 1, which has a bond strength of at least 0.5 N/cm in an adhesive coated area thereof.

13. The shaped article as claimed in claim 1, which is disbondable by stretching.

14. The shaped article as claimed in claim 1, which is detachable without residue.

15. The shaped article as claimed in claim 1, whose adhesive area is situated within a projection area in plan view.

16. The shaped article as claimed in claim 1, which is reversibly bondable.

17. The shaped article as claimed in claim 1, which has a temperature stability of at least 60° C.

18. The shaped article as claimed in claim 1, which is perforated in a transverse direction.

19. The shaped article as claimed in claim 1, which is tearable in a transverse direction.

20. The shaped article as claimed in claim 1, which has at least one rounded edge.

21. The use of a shaped article as claimed in any of claims 1–20 for masking, especially for the temporary masking of surfaces during their treatment, especially their painting.

22. The use of a shaped article as claimed in any of claims 1–20 for making, especially for the temporary masking of surfaces as protection against mechanical stresses.

23. A method of masking a surface while subjecting said surface to a treatment, said method comprising:
   a) applying a shaped article according to any one of claims 1 to 20 or 26 to 38 to said surface to mask said surface; and
   b) subjecting said surface to said treatment.

24. The method according to claim 23, wherein the treatment comprises painting.

25. The method according to claim 23, wherein the treatment produces a mechanical stress against a portion of the surface which is masked.

26. The shaped article as claimed in claim 2, whose thickness is from 5 to 120 mm.

27. The shaped article as claimed in claim 2, whose thickness is from 6 to 30 mm.

28. The shaped article as claimed in claim 3, whose elongation under a load of 5 N/cm is from 30 to 500%.

29. The shaped article as claimed in claim 7, which has a width of 6 to 200 mm.

30. The shaped article as claimed in claim 7, which has a width of 8 to 30 mm.

31. The shaped article as claimed in claim 9, whose height/width ratio is from 0.1 to 0.95.

32. The shaped article as claimed in claim 9, whose height/width ratio is from 0.2 to 0.9.

33. The shaped article as claimed in claim 12, which has a bond strength of from 1.0 N/cm to 25 N/cm.

34. The shaped article as claimed in claim 12, which has a bond strength of from 1.5 to 22 N/cm.

35. The shaped article as claimed in claim 17, which has a temperature stability of from 65° C. to 220° C.

36. The shaped article as claimed in claim 17, which has a temperature stability of from 68° C. to 150° C.

37. The shaped article as claimed in claim 17, which has a temperature stability of from 70° C. to 120° C.

38. The shaped article as claimed in claim 3, whose elongation under a load of 5 N/cm is from 25 to 1000%.

* * * * *

UNITED STATES PATENT AND TRADEMARK OFFICE
CERTIFICATE OF CORRECTION

| | | |
|---|---|---|
| PATENT NO. | : 6,630,227 B1 | Page 1 of 1 |
| APPLICATION NO. | : 09/705551 | |
| DATED | : October 7, 2003 | |
| INVENTOR(S) | : Himmelsbach et al. | |

It is certified that error appears in the above-identified patent and that said Letters Patent is hereby corrected as shown below:

Delete Column 8, Lines 54-59.

Signed and Sealed this

Twenty-eighth Day of November, 2006

JON W. DUDAS
*Director of the United States Patent and Trademark Office*